US012573607B2

(12) United States Patent
Kim et al.

(10) Patent No.: US 12,573,607 B2
(45) Date of Patent: Mar. 10, 2026

(54) SECONDARY BATTERY CATHODE HAVING IMPROVED THERMAL STABILITY AND MANUFACTURING METHOD THEREFOR

(71) Applicant: LG CHEM, LTD., Seoul (KR)

(72) Inventors: Hee Jin Kim, Daejeon (KR); Kwan Soo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 892 days.

(21) Appl. No.: 17/277,279

(22) PCT Filed: Jul. 27, 2020

(86) PCT No.: PCT/KR2020/009867
§ 371 (c)(1),
(2) Date: Mar. 17, 2021

(87) PCT Pub. No.: WO2021/020844
PCT Pub. Date: Feb. 4, 2021

(65) Prior Publication Data
US 2021/0359294 A1      Nov. 18, 2021

(30) Foreign Application Priority Data

Jul. 26, 2019      (KR) ........................ 10-2019-0091046

(51) Int. Cl.
*H01M 4/36*      (2006.01)
*H01M 4/04*      (2006.01)
(Continued)

(52) U.S. Cl.
CPC ......... *H01M 4/131* (2013.01); *H01M 4/0404* (2013.01); *H01M 4/1391* (2013.01);
(Continued)

(58) Field of Classification Search
None
See application file for complete search history.

(56) References Cited

U.S. PATENT DOCUMENTS 10,686,215 B2      6/2020  Kim et al.
2013/0216897 A1*    8/2013  Kim .................... H01M 10/052
                                                          429/211
(Continued)

FOREIGN PATENT DOCUMENTS

CN          102324493 A  *  1/2012
CN          108221051 A      6/2018
(Continued)

OTHER PUBLICATIONS

Extended European Search Report issued from the European Patent Office dated Feb. 25, 2022 in connection with the corresponding European Patent Application No. 20846849.6.
(Continued)

*Primary Examiner* — Zhongqing Wei
(74) *Attorney, Agent, or Firm* — Morgan, Lewis & Bockius LLP

(57)      ABSTRACT

The present invention relates to a cathode for a lithium secondary battery, a manufacturing method therefor, and a lithium secondary battery comprising the cathode. The cathode for a lithium secondary battery comprises a cathode active material layer formed to contain a very low content of conductive material at the outermost side thereof, whereby the cathode can have high thermal stability when an internal short-circuit of a battery occurs, and can achieve high-power properties when applied to a secondary battery.

15 Claims, 1 Drawing Sheet

100

(51) Int. Cl.

| | |
|---|---|
| *H01M 4/131* | (2010.01) |
| *H01M 4/1391* | (2010.01) |
| *H01M 4/505* | (2010.01) |
| *H01M 4/525* | (2010.01) |
| *H01M 4/62* | (2006.01) |
| *H01M 10/0525* | (2010.01) |
| *H01M 4/02* | (2006.01) |

(52) U.S. Cl.
CPC ........... *H01M 4/525* (2013.01); *H01M 4/625* (2013.01); *H01M 10/0525* (2013.01); *H01M 2004/021* (2013.01); *H01M 2004/028* (2013.01)

(56) References Cited

U.S. PATENT DOCUMENTS

| | | | | |
|---|---|---|---|---|
| 2019/0036154 A1* | 1/2019 | Kim | .................. | H01M 4/525 |
| 2019/0229330 A1* | 7/2019 | Kim | .................. | H01M 4/505 |
| 2019/0312259 A1* | 10/2019 | Baek | .................. | H01M 4/62 |

FOREIGN PATENT DOCUMENTS

| | | | |
|---|---|---|---|
| CN | 108400313 A | 8/2018 | |
| CN | 108475772 A | 8/2018 | |
| CN | 108511746 A | 9/2018 | |
| CN | 108539252 A | 9/2018 | |
| EP | 3182487 A1 | 6/2017 | |
| EP | 3396744 A1 | 10/2018 | |
| JP | 2001-338639 A | 12/2001 | |
| JP | 2007-035589 A | 2/2007 | |
| JP | 2007-280687 A | 10/2007 | |
| JP | 2013-020777 A | 1/2013 | |
| JP | 2018-073602 A | 5/2018 | |
| KR | 10-1287676 B1 | 8/2013 | |
| KR | 10-2013-0116027 A | 10/2013 | |
| KR | 10-2014-0140976 A | 12/2014 | |
| KR | 10-2016-0111673 A | 9/2016 | |
| KR | 10-2017-0014299 A | 2/2017 | |
| KR | 2018-0058119 A | 5/2018 | |
| KR | 2018-0118913 A | 11/2018 | |
| KR | 10-2019-0001566 A | 1/2019 | |
| KR | 10-2019-0064462 A | 6/2019 | |
| KR | 10-2019-0086229 A | 7/2019 | |
| WO | WO-2006010894 A1 * | 2/2006 | ........ H01M 10/0525 |
| WO | 2011029058 A2 | 3/2011 | |
| WO | 2013/014830 A1 | 1/2013 | |

OTHER PUBLICATIONS

Office Action dated Jan. 11, 2023 issued in corresponding Korean Patent Application No. 10-2019-0091046.
Office Action dated Aug. 31, 2023 issued in corresponding Chinese Patent Application No. 202080005073.3.
International Search Report dated Nov. 3, 2020 issued in corresponding International Patent Application No. PCT/KR2020/009867.

* cited by examiner

【FIG. 1】
100
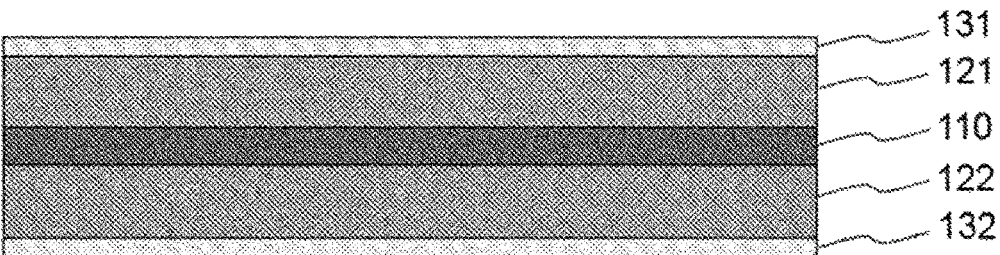
131
121
110
122
132
【FIG. 2】
200
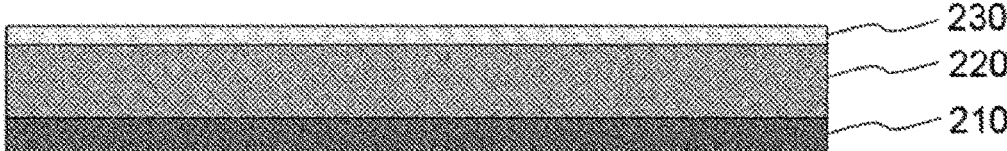
230
220
210

SECONDARY BATTERY CATHODE HAVING IMPROVED THERMAL STABILITY AND MANUFACTURING METHOD THEREFOR

TECHNICAL FIELD

This application claims the benefit of priority based on Korean Patent Application No. 10-2019-0091046, filed on Jul. 26, 2019, and the entire contents of the Korean patent application are incorporated herein by reference.

The present invention relates to a positive electrode for a secondary battery, a method of manufacturing the same, and a secondary battery including the positive electrode.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

In addition, the secondary battery has attracted attention as an energy source of an electric vehicle, a hybrid electric vehicle, etc., which are proposed as a solution for air pollution of existing gasoline vehicles and diesel vehicles using fossil fuel. In order to be applied as an energy source of an electric vehicle, a high-power battery is required.

As a way to increase the output characteristics of secondary batteries, the development of a high-content nickel (High-Ni)-based NCM positive electrode active material having a high energy density is drawing attention. However, a secondary battery to which a high content nickel (High-Ni) NCM positive electrode active material is applied has poor stability of a battery cell and is particularly vulnerable to an exothermic reaction due to an internal short circuit. Therefore, there is a need to develop a positive electrode active material for a secondary battery that can increase the output characteristics of a battery without impairing the stability of the battery cell.

DISCLOSURE

Technical Problem

The present invention has been invented to solve the above problems, and an object of the present invention is to provide a positive electrode for a lithium secondary battery having thermal stability in case of an internal short circuit, a method for manufacturing the same, and a lithium secondary battery including the positive electrode.

Technical Solution

A positive electrode for a lithium secondary battery according to the present invention includes: a positive electrode current collector; and a positive electrode active material layer formed on one or both surfaces of the positive electrode current collector, and the positive electrode active material layer includes a lower positive electrode active material layer formed to contact the positive electrode current collector; and an upper active material layer formed on the lower positive electrode active material layer. Herein, the lower positive electrode active material layer has a conductive material content of 0.5 wt % or more with respect to the lower positive electrode active material layer, and the upper positive electrode active material layer has a conductive material content of 0.15 wt % or less with respect to the upper positive electrode active material layer.

In one example, in the positive electrode for the lithium secondary battery according to the present invention, the conductive material content of the lower positive electrode active material layer is 0.85 to 0.95% by weight with respect to the lower positive electrode active material layer, and the conductive material content of the upper positive electrode active material layer is 0.05 to 0.15% by weight with respect to the upper positive electrode active material layer.

In the positive electrode for the lithium secondary battery of the present invention, if the lower positive electrode active material layer and the upper positive electrode active material layer are formed on both sides of the positive electrode current collector, a thickness and a loading amount of the upper positive electrode active material layer and the lower positive electrode active material layer located on one side of the positive electrode current collector are same as or different from a thickness and a loading amount of the upper positive electrode active material layer and the lower positive electrode active material layer located on the other side of the positive electrode current collector.

In another example, the ratio of the cross-sectional thickness (D1) of the lower positive electrode active material layer to the cross-sectional thickness (D2) of the upper positive electrode active material layer is in the range of 85 to 97:3 to 15 (D1:D2). Specifically, the cross-sectional thickness D2 of the upper positive electrode active material layer is in the range of 3 to 20 μm. Preferably, the ratio of the cross-sectional thickness (D1) of the lower positive electrode active material layer and the cross-sectional thickness (D2) of the upper positive electrode active material layer is in the range of 90 to 97:3 to 10 (D1:D2), and the cross-sectional thickness (D2) of the upper positive electrode active material layer is in the range of 3 to 15 μm.

In one example, the upper positive electrode active material layer is a carbon nanotube, which is a needle type carbon-based conductive material as a conductive material.

In one example, the positive electrode active material layer of the positive electrode for a lithium secondary battery according to the present invention includes an active material component having a structure represented by Chemical Formula 1 below.

$$Li_x(Ni_aCo_bMn_c)O_2 \qquad \text{[Chemical formula 1]}$$

$(0.5<x<1.3, 0.5<a<1, 0<b<0.25, 0<c<0.25, a+b+c=1)$

The present invention also provides a method of manufacturing a positive electrode for a lithium secondary battery described above. A method for manufacturing a positive electrode for a lithium secondary battery includes:

a step of preparing a slurry for a lower positive electrode active material layer by dispersing a first positive electrode active material, a first conductive material, and a first binder polymer in a solvent, and preparing a slurry for a upper positive electrode active material layer by dispersing a second positive electrode active material, a second conductive material, and a second binder polymer in a solvent;

a step of applying a slurry for the lower positive electrode active material layer to one or both surfaces of the positive electrode current collector; and a step of applying a slurry for the upper positive electrode active material layer thereon before or after the slurry for the lower positive electrode active material layer is dried.

Herein, the lower positive electrode active material layer has a conductive material content of 0.5 wt % or more with respect to the lower positive electrode active material layer, and the upper positive electrode active material layer has a conductive material content of 0.15 wt % or less with respect to the upper positive electrode active material layer.

In the method of manufacturing the positive electrode for the lithium secondary battery of the present invention, if the slurry for the upper positive electrode active material layer and the slurry for the lower positive electrode active material layer are applied to both sides of the positive electrode current collector, a thickness and a loading amount of the upper positive electrode active material layer and the lower positive electrode active material layer applied on one side of the positive electrode current collector are same as or different from a thickness and a loading amount of the upper positive electrode active material layer and the lower positive electrode active material layer located on the other side of the positive electrode current collector.

In one example, the ratio of the cross-sectional thickness (D1) of the lower positive electrode active material layer to the cross-sectional thickness (D2) of the upper positive electrode active material layer is in the range of 85 to 97:3 to 15 (D1:D2).

In addition, the present invention provides a lithium secondary battery including the positive electrode for the lithium secondary battery described above. The lithium secondary battery is an NCM-based lithium secondary battery having a high nickel content.

Advantageous Effects

According to a positive electrode for a secondary battery and its manufacturing method according to the present invention, thermal stability can be increased in case of an internal short circuit of the battery, and high output characteristics can be realized when applied to a secondary battery.

BRIEF DESCRIPTION OF THE DRAWINGS

FIGS. 1 and 2 are views each schematically showing a cross section of a positive electrode for a lithium secondary battery according to an embodiment of the present invention.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The "lower positive electrode active material layer" as used herein refers to the active material layer in contact with the positive electrode current collector, and The "upper positive electrode active material layer" refers to an active material layer stacked on the lower positive electrode active material layer and located on the outermost part of the electrode.

The present invention provides a positive electrode for a lithium secondary battery. The positive electrode for the lithium secondary battery includes: a positive electrode current collector; and a positive electrode active material layer formed on one or both surfaces of the positive electrode current collector, and the positive electrode active material layer has a two-layer structure including a lower positive electrode active material layer formed to contact the positive electrode current collector; and an upper active material layer formed on the lower positive electrode active material layer. The lower positive electrode active material layer has a conductive material content of 0.5 wt % or more with respect to the lower positive electrode active material layer, and the upper positive electrode active material layer has a conductive material content of 0.15 wt % or less with respect to the upper positive electrode active material layer. When the content of the conductive material in the upper positive electrode active material layer exceeds 0.15% by weight, there is a problem in that it is impossible to prevent internal short circuit due to the suppression of electrical conductivity induced in the present invention.

In one embodiment, in the positive electrode for a lithium secondary battery according to the present invention, the content of the conductive material in the lower positive electrode active material layer is preferably in the range of 0.85 to 0.95% by weight with respect to the lower positive electrode active material layer. In addition, the content of the conductive material in the upper positive electrode active material layer is preferably in the range of 0.05 to 0.15% by weight with respect to the upper positive electrode active material layer.

The positive electrode for a lithium secondary battery according to the present invention has a structure in which a lower positive electrode active material layer and an upper positive electrode active material layer are sequentially stacked on one or both sides of a positive electrode current collector. In particular, the upper positive electrode active material layer is characterized in that the content of the conductive material is very small.

FIG. 1 shows a structure in which a lower positive electrode active material layer and an upper positive electrode active material layer are stacked on both sides of a positive electrode current collector. Herein, a lower positive electrode active material layer 121 is stacked on one side of a positive electrode current collector 110, and a lower positive electrode active material layer 122 is stacked on the other side of the positive electrode current collector 110. An upper positive electrode active material layer 131 is stacked on the lower positive electrode active material layer 121, and an upper positive electrode active material layers 132 is stacked on the lower positive electrode active material layer 122.

That is, the positive electrode is a positive electrode in which lower positive electrode active material layers 121 and 122 and upper positive electrode active material layers 131 and 132 are stacked on each side of the positive electrode current collector 110.

Meanwhile, FIG. 2 shows a structure in which a lower positive electrode active material layer and an upper positive electrode active material layer are stacked on one side of a positive electrode current collector, and shows a positive electrode having a structure in which a lower positive electrode active material layer 220 is stacked on one surface of the positive electrode current collector 210, and an upper positive electrode active material layer 230 is stacked thereon. In one embodiment of the present invention, when manufacturing the positive electrode of the structure of FIG. 1, the compositions of respective lower positive electrode active material layers 121 and 122 on the positive electrode current collector 110 is configured to be the same, and the compositions of the upper positive electrode active material layer 131, 132 thereon are configured to be the same, but it is also possible to make the composition of each layer different while satisfying the range of the conductive material of the present invention.

Meanwhile, in the manufacture of the positive electrode of FIG. 1 of the present invention, the thickness and loading amount of the upper positive electrode active material layer 131 and the lower positive electrode active material layer 121 located on one side of the positive electrode current collector 110 may be the same as or different from the thickness and the loading amount of the upper positive electrode active material layer 132 and the lower positive electrode active material layer 122 located on the other side of the positive electrode current collector 110. That is, the thickness and loading amount of each upper positive electrode active material layer 131 and 132 may be the same or different, and the thickness and loading amount of each lower positive electrode active material layer 121 and 122 may be the same or different.

Meanwhile, in the present invention, by controlling the content of the conductive material in the upper positive electrode active material layer to a very low level, electrical conductivity of the corresponding layer is suppressed. Through this, even when the inside of the battery cell is short-circuited, an exothermic reaction due to an internal short circuit can be reduced, and an explosion can be prevented. On the other hand, the lower positive electrode active material layer maintains the content of the conductive material in a typical range or a slightly higher range. Through this, the lower positive electrode active material layer increases electrical conductivity between the positive electrode current collector and the positive electrode active material layer, and prevents deterioration of battery performance.

The positive electrode for a lithium secondary battery according to the present invention has a structure in which a lower positive electrode active material layer and an upper positive electrode active material layer are sequentially stacked on one or both sides of a positive electrode current collector, and the upper positive electrode active material layer has a very thin thickness.

In one example, the ratio of the cross-sectional thickness (D1) of the lower positive electrode active material layer to the cross-sectional thickness (D2) of the upper positive electrode active material layer is in the range of 85 to 97:3 to 15 (D1:D2). In this case, the total thickness of the positive electrode active material layer is in the range of 80 to 150 μm.

Specifically, the cross-sectional thickness (D2) of the upper positive electrode active material layer is in the range of 3 to 20 μm, 3 to 15 μm, or 3 to 10 μm. For example, the ratio of the cross-sectional thickness (D1) of the lower positive electrode active material layer and the cross-sectional thickness (D2) of the upper positive electrode active material layer is in the range of 90 to 97:3 to 10 (D1:D2), and the cross-sectional thickness (D2) of the upper positive electrode active material layer is in the range of 3 to 15 μm.

If the D2 ratio value in the D1:D2 is less than 3 or the cross-sectional thickness (D2) is less than 3 μm, there is a problem that the insulation characteristics of the present invention is difficult to be shown, and if the D2 ratio value is more than 15 or the cross-sectional thickness D2 is more than 20 μm, the electrical conductivity is extremely deteriorated, which may cause cell performance degradation.

In the present invention, the thickness of the cross-section of the upper positive electrode active material layer is formed to be very small, and the upper positive electrode active material layer suppresses the electrical conductivity of the corresponding layer. The thickness range of the upper positive electrode active material layer is a range that does not cause deterioration in performance of a battery cell while providing an appropriate level of insulating properties.

In addition, in the present invention, the upper and lower positive electrode active material layers may use both a sphere type or needle type conductive material as a conductive material.

Here, the "sphere type" means having a spherical particle shape, and having an average diameter (D50) of 10 to 500 nm, specifically 15 to 100 nm or 15 to 40 nm.

The sphere-type carbon-based conductive material may improve physical contact between active materials to reduce interface resistance by filling the pores, which are empty spaces between active material particles in a mixed state with a binder, and may improve the adhesion between the lower positive electrode active material and the current collector. The sphere type carbon-based conductive material may include carbon black including Denka Black, for example, FX35 (Denka), SB50L (Denka), Super-P, but is not limited thereto.

In a sense corresponding to the sphere type carbon-based conductive material, there is a needle type carbon-based conductive material. Here, the term "needle type" means that the shape of a particle like a needle, for example, an aspect ratio (a value of length/diameter) is in a range of 50 to 650, specifically 60 to 300 or 100 to 300. The needle type carbon-based conductive material may be a carbon nanotube (CNT), a vapor-grown carbon fiber (VGCF), a carbon nanofiber (CNF), or a mixture of two or more of them.

In the present invention, a linear carbon-based conductive material is preferably used for the positive electrode active material layer. The needle type carbon-based conductive material has a higher electrical conductivity than the sphere type carbon-based conductive material, and is distributed in a form surrounding the surface of the active material between the active material in the active material layer, thereby advantageous in forming a conductive network, thereby reducing the content of the conductive material. In addition, since it does not block pores, which are empty spaces between active materials, it is advantageous to develop pores, thereby facilitating the diffusion of lithium ions, thereby reducing diffusion resistance.

In addition, in the present invention, the upper positive electrode active material layer includes 80% by weight or more of a needle type carbon-based conductive material as a conductive material. The content of the conductive material is calculated based on 100% by weight of the total content of the conductive material in the layer.

In one example of the present invention, the upper positive electrode active material layer and the lower positive electrode active material layer include a positive electrode active material and a binder polymer in addition to the conductive material and may further include a positive electrode additive commonly used in the related art, if necessary.

The positive electrode active materials applicable to the upper positive electrode active material layer and the lower positive electrode active material layer may be independently lithium-containing oxides, and may be the same or different. A lithium-containing transition metal oxide may be used as the lithium-containing oxide.

For example, the lithium-containing transition metal oxide may be any one or a mixture of two or more selected from the group consisting of $Li_xCoO_2(0.5<x<1.3)$, $Li_xNiO_2$ $(0.5<x<1.3)$, $Li_xMnO_2(0.5<x<1.3)$, $Li_xMn_2O_4(0.5<x<1.3)$, $Li_x(Ni_aCo_bMn_c)O_2(0.5<x<1.3, 0<a<1, 0<b<1, 0<c<1, a+b+$ c=1), $Li_xNi_{1-y}Co_yO_2(0.5<x<1.3, 0<y<1)$, $Li_xCo_{1-y}Mn_yO_2$ $(0.5<x<1.3, 0\leq y<1)$, $Li_xNi_{1-y}Mn_yO_2(0.5<x<1.3, 0\leq y<1)$, $Li_x(Ni_aCo_bMn_c)O_4(0.5<x<1.3, 0<a<2, 0<b<2, 0<c<2, a+b+c=2)$, $Li_xMn_{2-z}Ni_zO_4(0.5<x<1.3, 0<z<2)$, $Li_xMn_{2-z}Co_zO_4$ $(0.5<x<1.3, 0<z<2)$, $Li_xCoPO_4(0.5<x<1.3)$ and $Li_xFePO_4$ $(0.5<x<1.3)$, and the lithium-containing transition metal oxide may be coated with a metal or metal oxide such as aluminum (Al). Further, in addition to the lithium-containing transition metal oxide, sulfide, selenide, and halide may be used.

The positive electrode according to the present invention can be applied to various types of lithium secondary batteries, but is preferably used for high-power batteries. The positive electrode active material layer of the present invention is applied to a high content nickel (High-Ni)-based NCM battery.

In a specific example, the positive electrode active material layer according to the present invention includes an active material component having a structure represented by Chemical Formula 1 below.

$$Li_x(Ni_aCo_bMn_c)O_2 \qquad \text{[Chemical formula 1]}$$

$(0.5<x<1.3, 0.5<a<1, 0<b<0.25, 0<c<0.25, a+b+c=1)$

In Chemical Formula 1, the value a is 0.6 or more, specifically 0.8 or more. In the Formula 1, as the value a increases, the value b and/or value c decrease within the range satisfying the above Formula 1. Through this, the positive electrode for a lithium secondary battery according to the present invention is applied to a high-Ni-based NCM secondary battery. The NCM secondary battery is, for example, an NCM 622 or NCM 811 lithium secondary battery.

The current collector used for the positive electrode is a metal having high conductivity, and any metal which the positive electrode active material slurry may be easily attached to and which is not reactive in the voltage range of the electrochemical device can be used. Specifically, non-limiting examples of the current collector for the positive electrode include aluminum, nickel, or a foil manufactured by a combination thereof.

The positive electrode active material may be included in the range of 94.0 to 98.5 wt % in the positive electrode active material layer. When the content of the positive electrode active material satisfies the above range, it is advantageous in terms of manufacturing a high-capacity battery and providing sufficient conductivity of the positive electrode or adhesion between electrode materials.

The binder polymer used in each of the upper positive electrode active material layer and the lower positive electrode active material layer may be a binder commonly used in the art without limitation. For example, various kinds of binders such as polyvinylidene fluoride-co-hexafluoropropylene (PVDF-co-HFP), polyvinylidene fluoride (PVDF), polyacrylonitrile, polymethyl methacrylate, styrene-butadiene rubber (SBR), and carboxyl methyl cellulose (CMC) may be used.

The content of the binder polymer is proportional to the content of the conductive material included in the upper positive electrode active material layer and the lower positive electrode active material layer. This is to impart adhesion to conductive materials whose particle size is relatively small compared to the active material and is because when the content of the conductive material increases, more binder polymer is required, and when the content of the conductive material decreases, less binder polymer can be used.

The present invention also provides a method of manufacturing a positive electrode for a lithium secondary battery described above.

In one example, a method for manufacturing a positive electrode for a lithium secondary battery includes:

a step of preparing a slurry for a lower positive electrode active material layer by dispersing a first positive electrode active material, a first conductive material, and a first binder polymer in a solvent, and preparing a slurry for a upper positive electrode active material layer by dispersing a second positive electrode active material, a second conductive material, and a second binder polymer in a solvent;

a step of applying a slurry for the lower positive electrode active material layer to one or both surfaces of the positive electrode current collector; and a step of applying a slurry for the upper positive electrode active material layer thereon before or after the slurry for the lower positive electrode active material layer is dried.

Further, in one example of the present invention, if the slurry for the upper positive electrode active material layer and the slurry for the lower positive electrode active material layer are applied to both sides of the positive electrode current collector, a thickness and a loading amount of the upper positive electrode active material layer and the lower positive electrode active material layer applied on one side of the positive electrode current collector are same as or different from a thickness and a loading amount of the upper positive electrode active material layer and the lower positive electrode active material layer located on the other side of the positive electrode current collector.

That is, the thickness and loading amount of the slurry for each upper positive electrode active material layer located on both sides of the current collector may be the same or different, and the thickness and loading amount of the slurry for each lower positive electrode active material layer may also be the same or different.

Here, the slurry for the lower positive electrode active material layer contains a conductive material content of 0.5% by weight or more with respect to the lower positive electrode active material layer. In addition, the upper positive electrode active material layer includes a conductive material content of 0.15% by weight or less with respect to the upper positive electrode active material layer.

Further, in the method of manufacturing the positive electrode for the lithium secondary battery of the present invention, if the slurry for the upper positive electrode active material layer and the slurry for the lower positive electrode active material layer are applied to both sides of the positive electrode current collector, a thickness and a loading amount of the upper positive electrode active material layer and the lower positive electrode active material layer applied on one side of the positive electrode current collector are same as or different from a thickness and a loading amount of the upper positive electrode active material layer and the lower positive electrode active material layer located on the other side of the positive electrode current collector.

In another example, the ratio of the cross-sectional thickness (D1) of the lower positive electrode active material layer to the cross-sectional thickness (D2) of the upper positive electrode active material layer is in the range of 85 to 97:3 to 15 (D1:D2).

The content of each component, cross-sectional thickness of each layer, and other details of the lower and upper positive electrode active material layers are the same as described above, and thus will be omitted.

Meanwhile, in the present application, the coating method of applying the upper positive electrode active material layer slurry before the lower positive electrode active material layer slurry is dried is referred to as a "wet-on-wet" method, and the coating method of applying the upper positive electrode active material layer slurry after the lower positive electrode active material layer slurry is dried is referred to as a "wet-on-dry" method.

The slurry for the upper positive electrode active material layer and the slurry for the lower positive electrode active material layer each may independently be applied sequentially by an application device commonly used in the art, such as a slot-die coater, a roll-coater, a knife coater or an extrusion coater. Alternatively, two layers can be applied substantially simultaneously by using a single coating head having two outlets or an extrusion coater having a back-up roll or a two-slot die.

When applying the wet-on-wet method, before the slurry for the lower positive electrode active material layer is completely dried, the slurry for the upper positive electrode active material layer is applied while the solvent is contained in an amount of 10 to 40% by weight in the slurry. Thereafter, a step of drying the upper and lower slurries at a temperature of about 100 to 150° C. for 5 minutes to 1 hour may be further included.

When the wet-on-dry method is applied, after the slurry for the lower positive electrode active material layer is completely dried, the slurry for the upper positive electrode active material layer is applied. A step of drying the lower slurry at a temperature of about 100 to 150° C. for 5 minutes to 1 hour, and then drying the upper slurry at a temperature of about 100 to 150° C. for about 5 minutes to 1 hour may be further included.

According to another embodiment of the present invention, there is provided an electrochemical device including: an electrode assembly including a positive electrode, a negative electrode, and a separator interposed between the positive electrode and the negative electrode; a non-aqueous electrolyte impregnating the electrode assembly; and a battery case containing the electrode assembly and the non-aqueous electrolyte.

The negative electrode may include a carbon material, lithium metal, silicon or tin as a negative electrode active material. When a carbon material is used as the negative electrode active material, both low crystalline carbon and high crystalline carbon may be used. Representative examples of low crystalline carbon include soft carbon and hard carbon are typical. Representative examples of high crystalline carbon include natural graphite, kish graphite, pyrolytic carbon, mesophase pitch based carbon fiber, mesocarbon microbeads, mesophase pitches, and high-temperature calcined carbons such as petroleum or coal tar pitch derived cokes.

Non-limiting examples of the current collector used for the negative electrode include copper, gold, nickel, or a foil manufactured by a copper alloy or a combination thereof. In addition, the current collector may be used by stacking substrates made of the above materials.

In addition, the negative electrode may include a conductive material and a binder commonly used in the art.

In the present invention, the separator may be made of any porous substrate used in a lithium secondary battery, and for example, a polyolefin-based porous membrane or a nonwoven fabric may be used, but the present invention is not particularly limited thereto.

Examples of the polyolefin-based porous membrane include polyethylene such as high density polyethylene, linear low density polyethylene, low density polyethylene, ultra high molecular weight polyethylene, and a membrane in which polyolefin-based polymers, such as polypropylene, polybutylene, and polypentene, are each formed alone or in a mixture thereof.

Polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, polyethylenenaphthalene, etc. may be used individually or as a polymer by a mixture thereof, to thereby form the non-woven fabric, in addition to polyolefin-based nonwoven fabric. The structure of the nonwoven fabric may be a spunbond nonwoven fabric composed of long fibers or a melt blown nonwoven fabric.

The thickness of the porous substrate is not particularly limited, but may be 5 to 50 μm, and the pore size and porosity present in the porous substrate are also not particularly limited, but may be 0.01 to 50 μm and 10 to 95%, respectively.

Meanwhile, in order to improve mechanical strength of the separator composed of the porous substrate and to suppress a short circuit between the positive electrode and the negative electrode, a porous coating layer including inorganic particles and a binder polymer may be further included on at least one surface of the porous substrate.

In the present invention, the non-aqueous electrolyte may contain an organic solvent and an electrolyte salt, and the electrolyte salt is a lithium salt. Those conventionally used in the electrolyte for lithium secondary batteries may be used as the lithium salt without limitation. For example, one or more selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $CF_3(CF_2)_7SO_3^-$, $CF_3CO_2^-$, $CH_3CO_2^-$, $SCN^-$ and $(CF_3CF_2SO_2)_2N^-$ may be included as the anion of the lithium salt.

As the organic solvent included in the nonaqueous electrolyte described above, those conventionally used in non-aqueous electrolytes for lithium secondary batteries may be used without limitation, and for example, ethers, esters, amides, linear carbonates, and cyclic carbonates may be used alone or in combination of two or more. Among them, representatively, a cyclic carbonate, a linear carbonate, or a carbonate compound that is a mixture thereof may be included.

Specific examples of the cyclic carbonate compound include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and a halide thereof, and a mixture thereof. These halides include, for example, fluoroethylene carbonate (FEC), but are not limited thereto.

In addition, specific examples of the linear carbonate compound include any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more of them may be typically used, but is not limited thereto.

In particular, among the carbonate-based organic solvents, ethylene carbonate and propylene carbonate, which are cyclic carbonates, are organic solvents of high viscosity and have high dielectric constants, so that lithium salts in the electrolyte can be more easily dissociated, and if the cyclic carbonate is mixed with a low viscosity, low dielectric constant linear carbonate such as dimethyl carbonate and diethyl carbonate in an appropriate ratio, an electrolyte solution having a higher electrical conductivity can be prepared.

In addition, as the ether of the organic solvent, any one selected from the group consisting of dimethyl ether, diethyl ether, dipropyl ether, methylethyl ether, methylpropyl ether, and ethylpropyl ether, or a mixture of two or more thereof may be used, but is not limited thereto.

And esters among the organic solvents include any one selected from the group consisting of methyl acetate, ethyl acetate, propyl acetate, methyl propionate, ethyl propionate, propyl propionate, $\gamma$-butyrolactone, $\gamma$-valerolactone, and $\gamma$-caprolactone, or a mixture of two or more of them, but the present invention is not limited thereto.

The injection of the non-aqueous electrolyte may be performed at an appropriate step in the manufacturing process of the electrochemical device, depending on the manufacturing process and required physical properties of the final product. That is, it can be applied before assembling the electrochemical device or at the final stage of assembling the electrochemical device.

Such an electrochemical device includes all devices that undergo an electrochemical reaction, and specific examples include all types of secondary cells, fuel cells, solar cells, or capacitors such as supercapacitor devices. Particularly, among the secondary batteries, a lithium secondary battery including a lithium metal secondary battery, a lithium ion secondary battery, a lithium polymer secondary battery or a lithium ion polymer secondary battery is preferred.

Hereinafter, the present invention will be described in detail with reference to examples. However, the embodiments according to the present invention may be modified into various other forms, and the scope of the present invention should not be construed as being limited to the embodiments described below. The examples of the present invention are provided to more fully describe the present invention to those skilled in the art.

Hereinafter, the present invention will be described in more detail through examples. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

EXAMPLES AND COMPARATIVE EXAMPLES

Example 1

A slurry for the lower positive electrode active material layers 121 and 122 was prepared by adding NCM ($LiNi_{0.8}Co_{0.1}Mn_{0.1}O_2$) 97.05% by weight as a positive electrode active material, carbon nanotube (LUCAN-BT1001M, LG Chem, aspect ratio 100 to 300) 0.95% by weight as a conductive material, and polyvinylidene fluoride (KF9700, Kureha) 2.0% by weight as a binder polymer, to NMP (N-methyl-2-pyrrolidone) as a solvent.

A slurry for the upper positive electrode active material layers 131 and 132 was prepared by adding NCM ($LiNi_{0.8}Co_{0.1}Mn_{0.1}O_2$) 97.95% by weight as a positive electrode active material, carbon nanotube (LUCAN-BT1001M, LG Chem, aspect ratio 100 to 300) 0.05% by weight as a conductive material, and KF9700 (Kureha) 2.0% by weight as a binder polymer, to NMP (N-methyl-2-pyrrolidone) as a solvent.

The slurry for the lower positive electrode active material layer 121 is coated on one side of the positive electrode current collector 110 made of aluminum foil to have a thickness of 60 μm with a loading amount of 500 mg/25 cm², and the slurry for the upper positive electrode active material layer 131 was coated thereon so that the thickness was 3 μm with a loading amount of 25 mg/25 cm².

Meanwhile, the slurry for the lower positive electrode active material layer 122 is coated on the other side of the positive electrode current collector 110 to a thickness of 55 μm with a loading amount of 480 mg/25 cm², and the slurry for the upper positive electrode active material layer 132 was coated thereon so that the thickness was 3 μm with a loading amount of 24 mg/25 cm².

The stacked structure of the prepared positive electrode is shown in FIG. 1. Referring to FIG. 1, the manufactured positive electrode 100 for a lithium secondary battery has a structure in which lower positive electrode active material layers 121 and 122 and upper positive electrode active material layers 131 and 132 are sequentially stacked on both sides of the positive electrode current collector 110.

In FIG. 1, each of the lower positive electrode active material layers 121 and 122 has the same slurry composition, and each of the upper positive electrode active material layers 131 and 132 also has the same composition.

However, as in Example 1, the loading amount and thickness of one side (top side) and the other side (back side) were configured differently based on the current collector.

Example 2

A slurry for the lower positive electrode active material layers 121 and 122 was prepared by adding NCM ($LiNi_{0.8}Co_{0.1}Mn_{0.1}O_2$) 97.1% by weight as a positive electrode active material, carbon nanotube (LUCAN-BT1001M, LG Chem, aspect ratio 100 to 300) 0.9% by weight as a conductive material, and KF9700 (Kureha) 2.0% by weight as a binder polymer, to NMP (N-methyl-2-pyrrolidone) as a solvent.

In the upper positive electrode active material layer, the positive electrode was prepared in the same manner as in the example 1 in which a slurry for the upper positive electrode active material layers 131 and 132 was prepared by adding NCM ($LiNi_{0.8}Co_{0.1}Mn_{0.1}O_2$) 97.9% by weight as a positive electrode active material, carbon nanotube (LUCAN-BT1001M, LG Chem, aspect ratio 100 to 300) 0.1% by weight as a conductive material, and KF9700 (Kureha) 2.0% by weight as a binder polymer, to NMP (N-methyl-2-pyrrolidone) as a solvent, and was then dried.

Example 3

A slurry for the lower positive electrode active material layers 121 and 122 was prepared by adding NCM ($LiNi_{0.8}Co_{0.1}Mn_{0.1}O_2$) 97.15% by weight as a positive electrode active material, carbon nanotube (LUCAN-BT1001M, LG Chem, aspect ratio 100 to 300) 0.85% by weight as a conductive material, and KF9700 (Kureha) 2.0% by weight as a binder polymer, to NMP (N-methyl-2-pyrrolidone) as a solvent.

In the upper positive electrode active material layer, the positive electrode was prepared in the same manner as in the example 1 in which a slurry for the upper positive electrode active material layers 131 and 132 was prepared by adding NCM ($LiNi_{0.8}Co_{0.1}Mn_{0.1}O_2$) 97.85% by weight as a positive electrode active material, carbon nanotube (LUCAN-BT1001M, LG Chem, aspect ratio 100 to 300) 0.15% by weight as a conductive material, and KF9700 (Kureha) 2.0% by weight as a binder polymer, to NMP (N-methyl-2-pyrrolidone) as a solvent, and was then dried.

Comparative Example 1

A positive electrode active material slurry was prepared by adding NCM ($LiNi_{0.8}Co_{0.1}Mn_{0.1}O_2$) 97.5% by weight as a positive electrode active material, carbon nanotube (LU-CAN-BT1001M, LG Chem, aspect ratio 100 to 300) 0.5% by weight as a conductive material, and polyvinylidene fluoride (KF9700, Kureha) 2.0% by weight as a binder polymer, to NMP (N-methyl-2-pyrrolidone) as a solvent.

The positive electrode active material slurry was loaded on one side of a positive electrode current collector composed of aluminum foil to be 525 mg/25 cm² and coated to have a thickness of 63 μm, and was loaded on the other side to be 504 mg/25 cm² and coated to have a thickness of 58 μm. Thereafter, a positive electrode having an active material layer on both sides was obtained through vacuum-drying the coated positive electrode active material slurry.

Experimental Example 1: Evaluation of Adhesion

In order to evaluate the adhesion between the aluminum current collector and the positive electrode active material layer, each of the positive electrodes prepared in the above-described Examples and Comparative Examples was cut to a certain size and fixed to the slide glass, and then the current collector was peeled off and the peel strength was measured at 90 degrees to evaluate the adhesion. At this time, UTM (Universal Test Machine) was used to measure the peel strength, and the evaluation results are shown in Table 1 below.

TABLE 1

| Division | Adhesive force (gf/20 mm) |
| --- | --- |
| Example 1 | 31.5 |
| Example 2 | 30.9 |
| Example 3 | 30.7 |
| Comparative Example 1 | 31.2 |

Referring to Table 1, it can be seen that the adhesion of Examples 1 to 3 in which the double-layer positive electrode active material layer is formed is equal or superior to that of Comparative Example 1 in which a single-layer positive electrode active material layer is formed. Accordingly, it can be seen that a decrease in adhesion is not caused in the positive electrode for a lithium secondary battery according to the present invention, compared to the comparative example.

Experimental Example 2

High Temperature Storage Performance Evaluation

For further evaluation, a lithium secondary battery including each of the positive electrodes prepared in Examples and Comparative Examples was manufactured.

In order to manufacture the lithium secondary battery, 100 parts by weight of artificial graphite (GT, Zichen (China)) as a negative electrode active material, 1.1 parts by weight of carbon black (Super-P) as a conductive material, 2.2 parts by weight of styrene-butadiene rubber, and 0.7 parts by weight of carboxy methyl cellulose was added to water as a solvent to thereby prepare a negative electrode active material slurry, and the slurry was coated once on a copper foil, dried and pressed to thereby prepare a negative electrode.

On the other hand, polypropylene was uniaxially stretched using a dry method to prepare a separator having a microporous structure with a melting point of 165° C. and a width of 200 mm on one side. Then the separator was interposed between the positive electrode and the negative electrode to manufacture an electrode assembly, and the electrode assembly was built into a pouch-type battery case. Thereafter, a 1.5M $LiPF_6$ carbonate-based electrolyte solution was injected to complete a battery.

High-temperature storage performance was evaluated for the secondary battery, and the results are shown in Table 2 below (conditions SOC 100, 60° C.).

Specifically, after each battery cell was prepared, the battery cell was charged in an SOC 100 state. After 100 days after leaving the battery cell in an oven at 60° C., the resistance increase rate (%) during high temperature storage of the battery cell was calculated by comparing the initial resistance before leaving the battery cell and the resistance at 6th week to thereby evaluate the high temperature storage performance.

TABLE 2

| Division | Resistance increase rate (%) |
| --- | --- |
| Example 1 | 8.57 |
| Example 2 | 8.76 |
| Example 3 | 9.76 |
| Comparative Example 1 | 8.20 |

Referring to Table 2, compared to Comparative Example 1, it was confirmed that the resistance increase rates of Examples 1 to 3 in which the double-layered positive electrode active material layer was formed were at a similar level. Accordingly, it can be seen that the positive electrode for a lithium secondary battery according to the present invention suppresses an increase in resistance during high temperature storage to a certain level, compared to the comparative example.

Experimental Example 3

Evaluation of Internal Short Circuit

Each lithium secondary battery prepared in Experimental Example 2 was subjected to an internal short circuit experiment. After each battery cell was prepared, the battery cell was fully charged to an SOC 100 state. The central portion of each battery cell was penetrated at a speed of 80 mm/sec using a needle (within a diameter of 3 mm or less). In the state where the needle was pierced, whether or not each battery cell was fired or exploded was observed.

The same experiment was performed on five battery cells in each case, and the results are shown in Table 3 below.

TABLE 3

| Division | Whether fired or exploded |
| --- | --- |
| Example 1 | X |
| Example 2 | X |
| Example 3 | X |
| Comparative Example 1 | ◯ |

In Table 3, no ignition occurred in the battery cells of Examples 1 to 3. However, in the case of Comparative Example 1, ignition occurred in one specimen out of five battery cells. It can be seen that the lithium secondary battery according to the present invention suppresses the internal exothermic reaction even when there is an internal short circuit, so that there is no risk of ignition.

The above description is merely illustrative of the technical idea of the present invention, and those skilled in the art to which the present invention pertains may make various modifications and variations without departing from the essential characteristics of the present invention. Therefore, the embodiments disclosed in the present invention are not intended to limit the technical idea of the present invention but to describe the present invention, and the scope of the technical idea of the present invention is not limited by these embodiments. The scope of protection of the present invention should be interpreted by the following claims, and all technical ideas within the scope equivalent thereto should be construed as being included in the scope of the present invention.

DESCRIPTION OF REFERENCE NUMERALS

100, 200: positive electrode for lithium secondary battery
110, 210: positive electrode current collector
121, 122, 220: lower positive electrode active material layer
131, 132, 230: upper positive electrode active material layer

The invention claimed is:

1. A positive electrode for a lithium secondary battery, comprising:
a positive electrode current collector; and a positive electrode active material layer disposed on one or both surfaces of the positive electrode current collector,
wherein the positive electrode active material layer consists of a lower positive electrode active material layer disposed in contact with the positive electrode current collector; and an upper positive electrode active material layer disposed on the lower positive electrode active material layer,
wherein the lower positive electrode active material layer has a conductive material content of 0.85% to 0.95% by weight with respect to a total weight of the lower positive electrode active material layer,
wherein the upper positive electrode active material layer includes a conductive material content of 0.05% to 0.15% by weight with respect to a total weight of the upper positive electrode active material layer,
wherein a ratio of a thickness (D1) of the lower positive electrode active material layer to a thickness (D2) of the upper positive electrode active material layer is in a range of 85:15 to 97:3 (D1:D2),
wherein the thickness (D2) of the upper positive electrode active material layer is in a range of 3 to 20 μm,
wherein a total thickness of the positive electrode active material layer is in a range of 80 to 150 μm, and
wherein the positive electrode active material layer includes an active material component represented by the following Chemical Formula 1 in an amount of 94.0 to 98.5 wt %:

$$Li_x(Ni_aCo_bMn_c)O_2 \qquad \text{[Chemical Formula 1]}$$

wherein, $0.5 < x < 1.3$, $0.5 < a < 1$, $0 < b < 0.25$, $0 < c < 0.25$, and $a+b+c=1$.

2. The positive electrode of claim 1, wherein when the lower positive electrode active material layer and the upper positive electrode active material layer are disposed on both sides of the positive electrode current collector, a thickness and a loading amount of the upper positive electrode active material layer and the lower positive electrode active material layer located on one side of the positive electrode current collector are same as a thickness and a loading amount of the upper positive electrode active material layer and the lower positive electrode active material layer located on the other side of the positive electrode current collector.

3. The positive electrode of claim 1, wherein a ratio of a thickness (D1) of the lower positive electrode active material layer to a thickness (D2) of the upper positive electrode active material layer is in a range of 90:10 to 97:3 (D1:D2), and wherein the thickness (D2) of the upper positive electrode active material layer is in a range of 3 to 15 μm.

4. The positive electrode of claim 1, wherein the upper positive electrode active material layer includes carbon nanotubes as a conductive material.

5. A method for manufacturing a positive electrode including a positive electrode current collector and a positive electrode active material layer for a lithium secondary battery of claim 1, comprising:
preparing a slurry for a lower positive electrode active material layer by dispersing a first positive electrode active material, a first conductive material, and a first binder polymer in a solvent, and preparing a slurry for an upper positive electrode active material layer by dispersing a second positive electrode active material, a second conductive material, and a second binder polymer in a solvent;
applying the slurry for the lower positive electrode active material layer to one or both surfaces of the positive electrode current collector; and
applying the slurry for the upper positive electrode active material layer on the lower positive electrode active material layer before or after the slurry for the lower positive electrode active material layer is dried.

6. The method of claim 5, wherein when the slurry for the upper positive electrode active material layer and the slurry for the lower positive electrode active material layer are applied to both sides of the positive electrode current collector, a thickness and a loading amount of the upper positive electrode active material layer and the lower positive electrode active material layer applied on one side of the positive electrode current collector are same as a thickness and a loading amount of the upper positive electrode active material layer and the lower positive electrode active material layer located on the other side of the positive electrode current collector.

7. A lithium secondary battery comprising the positive electrode for the lithium secondary battery according to claim 1.

8. The positive electrode of claim 1, wherein when the lower positive electrode active material layer and the upper positive electrode active material layer are disposed on both sides of the positive electrode current collector,
a thickness of the upper positive electrode active material layer located on one side of the positive electrode current collector is different from a thickness of the upper positive electrode active material layer located on the other side of the positive electrode current collector,
a thickness of the lower positive electrode active material layer located on one side of the positive electrode current collector is different from a thickness of the lower positive electrode active material layer located on the other side of the positive electrode current collector, a loading amount of the upper positive electrode active material layer located on one side of the positive electrode current collector is different from a loading amount of the upper positive electrode active material layer located on the other side of the positive electrode current collector, and a loading amount of the lower positive electrode active material layer located on one side of the positive electrode current collector is different from a loading amount of the lower positive electrode active material layer located on the other side of the positive electrode current collector.

9. The method of claim 5, wherein when the slurry for the upper positive electrode active material layer and the slurry for the lower positive electrode active material layer are applied to both sides of the positive electrode current collector, a thickness of the upper positive electrode active material layer applied on one side of the positive electrode current collector is different from a thickness of the upper positive electrode active material layer located on the other side of the positive electrode current collector, a thickness of the lower positive electrode active material layer applied on one side of the positive electrode current collector is different from a thickness of the lower positive electrode active material layer located on the other side of the positive electrode current collector, a loading amount of the upper positive electrode active material layer applied on one side of the positive electrode current collector is different from a loading amount of the upper positive electrode active material layer located on the other side of the positive electrode current collector, and a loading amount of the lower positive electrode active material layer applied on one side of the positive electrode current collector is different from a loading amount of the lower positive electrode active material layer located on the other side of the positive electrode current collector.

10. The positive electrode of claim 1, wherein the content of the conductive material in the upper positive electrode active material layer is lower than the content of the conductive material in the lower positive electrode active material layer.

11. The positive electrode of claim 1, wherein the active material component represented by following Chemical Formula 1 comprises $LiNi_{0.8}Co_{0.1}Mn_{0.1}O_2$.

12. The positive electrode of claim 1, wherein the positive electrode active material layer includes an active material component represented by the Chemical Formula 1 in an amount of 97.1 to 98.5 wt %.

13. The positive electrode of claim 1, wherein the active material component having the structure represented by Chemical Formula 1 is the only active material component in the positive electrode.

14. The positive electrode of claim 1, wherein in Chemical Formula 1, $0.6 < a < 1$.

15. The positive electrode of claim 1, wherein in Chemical Formula 1, $0.8 < a < 1$.

* * * * *